United States Patent [19]
Yonkers

[11] 3,949,343

[45] Apr. 6, 1976

[54] GROUNDED SURFACE DISTRIBUTION APPARATUS

[75] Inventor: Edward H. Yonkers, Wilmette, Ill.

[73] Assignee: Joslyn Mfg. and Supply Co., Chicago, Ill.

[22] Filed: Aug. 3, 1971

[21] Appl. No.: 168,716

Related U.S. Application Data

[60] Division of Ser. No. 4,396, Jan. 20, 1970, Continuation of Ser. No. 660,748, Aug. 15, 1967, abandoned.

[52] U.S. Cl. .............. 337/192; 339/94 R; 339/111; 339/143 R; 174/73 R; 339/60 R; 339/192 R; 174/52 PE
[51] Int. Cl.² ................ H01H 85/02; H01R 13/52
[58] Field of Search .................... 339/19, 59–61, 339/91, 94, 111, 136–143, 177; 174/18, 73 R, 77 R; 337/186, 187, 192, 204; 317/99, 118, 120, 114, 116; 200/302

[56] References Cited
UNITED STATES PATENTS

| | | | |
|---|---|---|---|
| 2,839,636 | 6/1958 | Brown................................. | 337/192 |
| 3,085,138 | 4/1963 | Brown et al. ....................... | 337/192 |
| 3,179,853 | 4/1965 | Kozacka ............................. | 337/186 |
| 3,377,487 | 4/1968 | McNulty.............................. | 174/18 |
| 3,522,404 | 8/1970 | Traynor.............................. | 200/302 |

*Primary Examiner*—Gerald P. Tolin
*Attorney, Agent, or Firm*—Mason, Kolehmainen, Rathburn & Wyss

[57] ABSTRACT

A grounded surface distribution apparatus and system is provided including elastomer encapsulated cable terminals, joints, taps, load-break switches, current limiting fuses and surge protectors, each enclosed completely within a metal sheath combined in various arrangements to perform operational functions required in loop and radial underground distribution systems. The cable terminals include a soft dielectric filler making a void-free interfacial engagement with the surface of a hard dielectric filler of a mating component. To provide for breaking a coupling under load, an arc-quenching follower is retractable into an axial cavity in the coupling components of the system and projectable therethrough upon breaking of the circuit and disconnecting of the components to provide an improved arc-quenching function. Thus, there is provided an underground system having security, operational safety and convenience.

8 Claims, 27 Drawing Figures

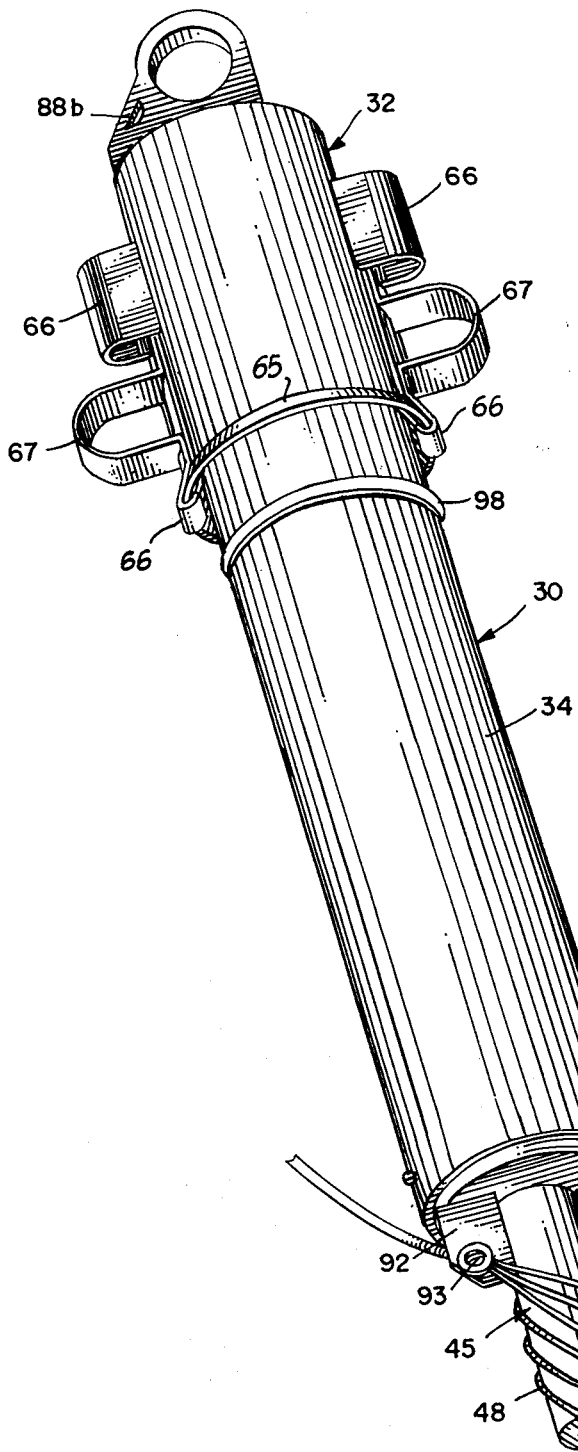
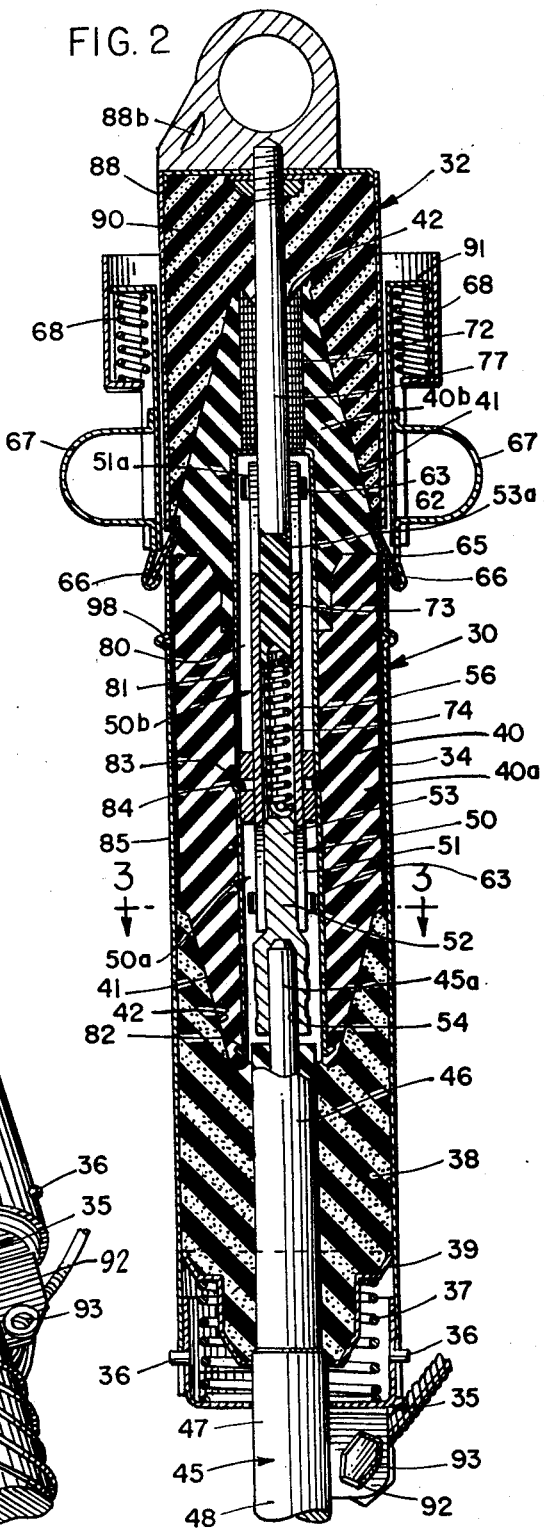

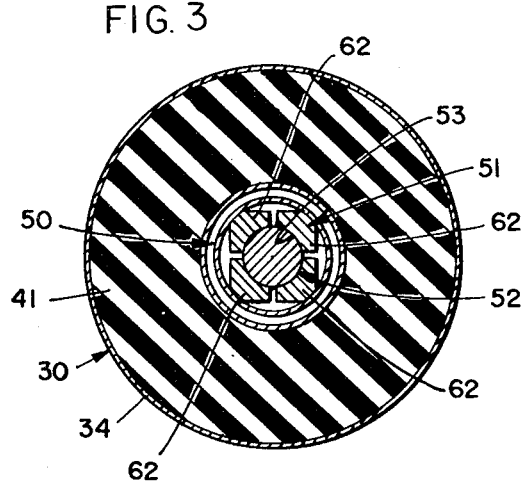
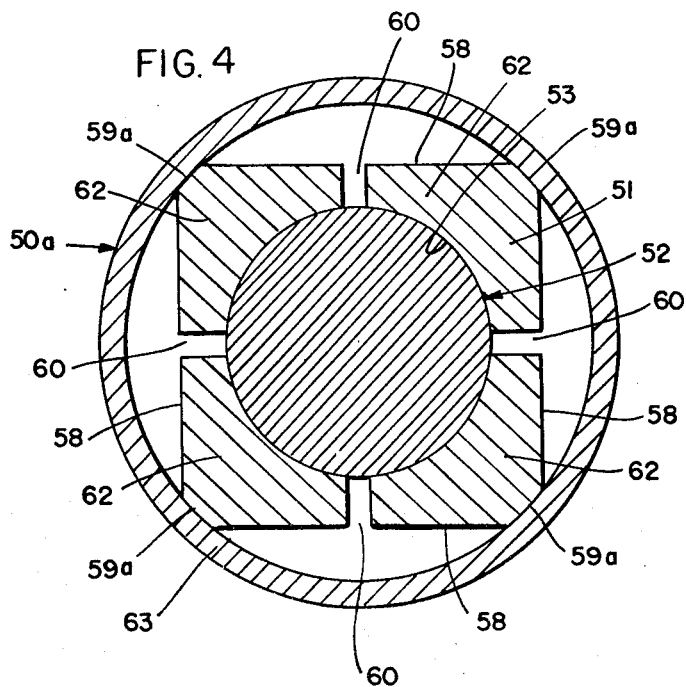
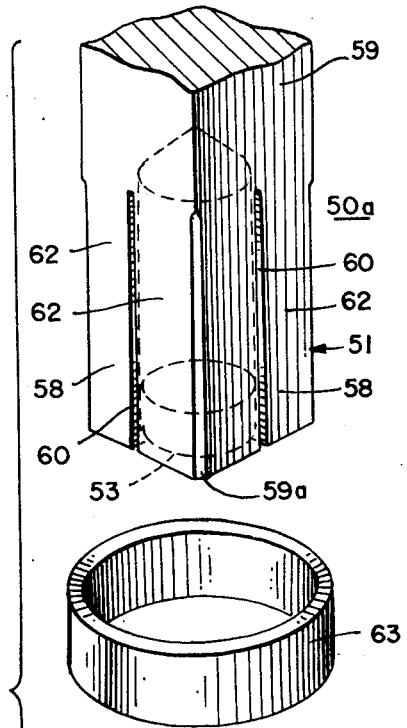
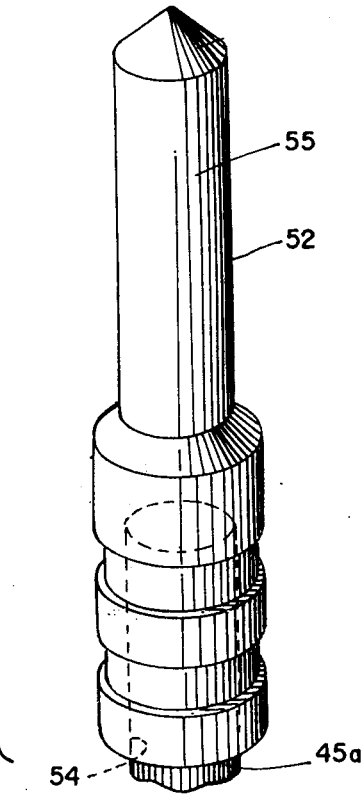

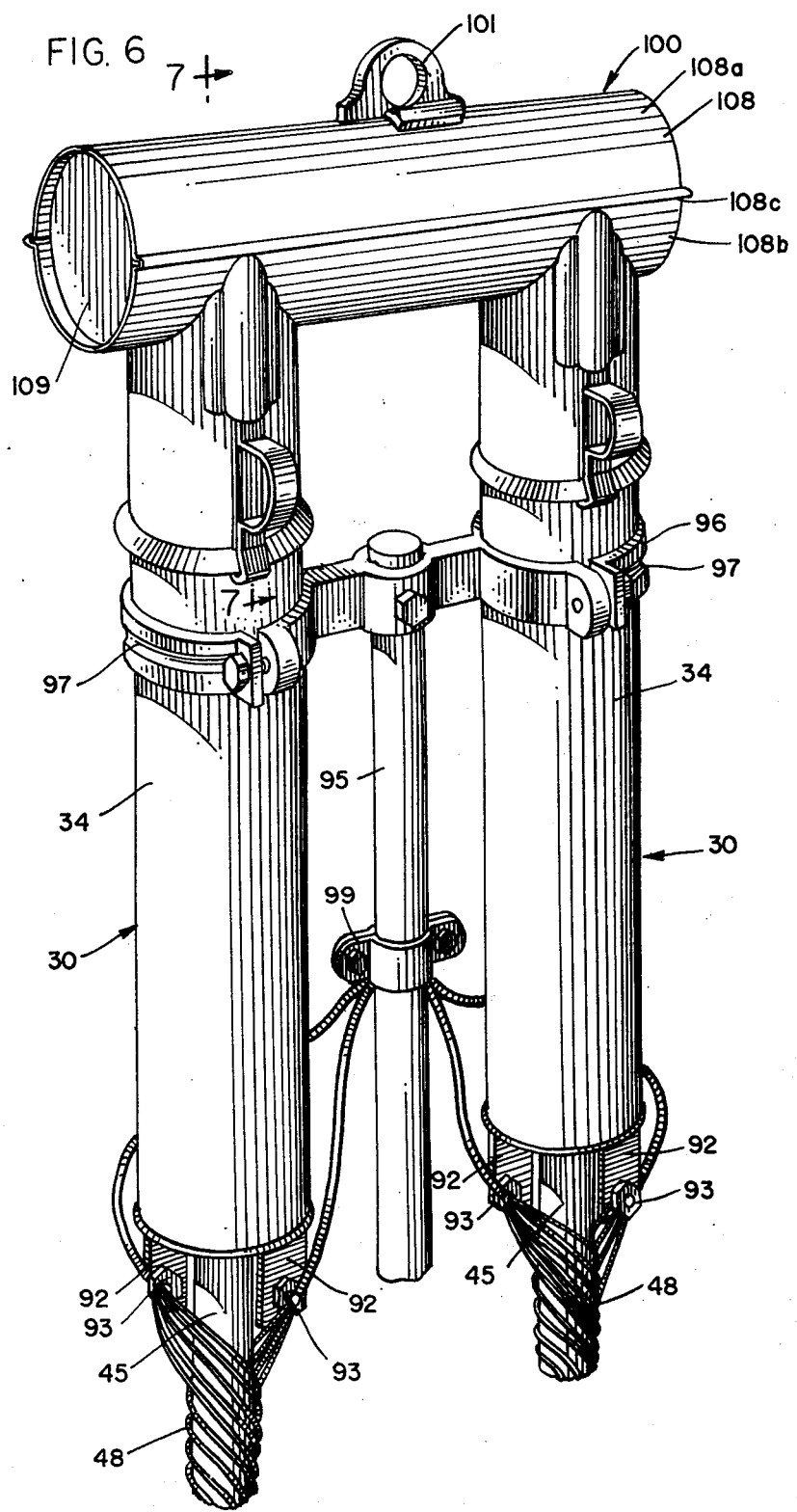

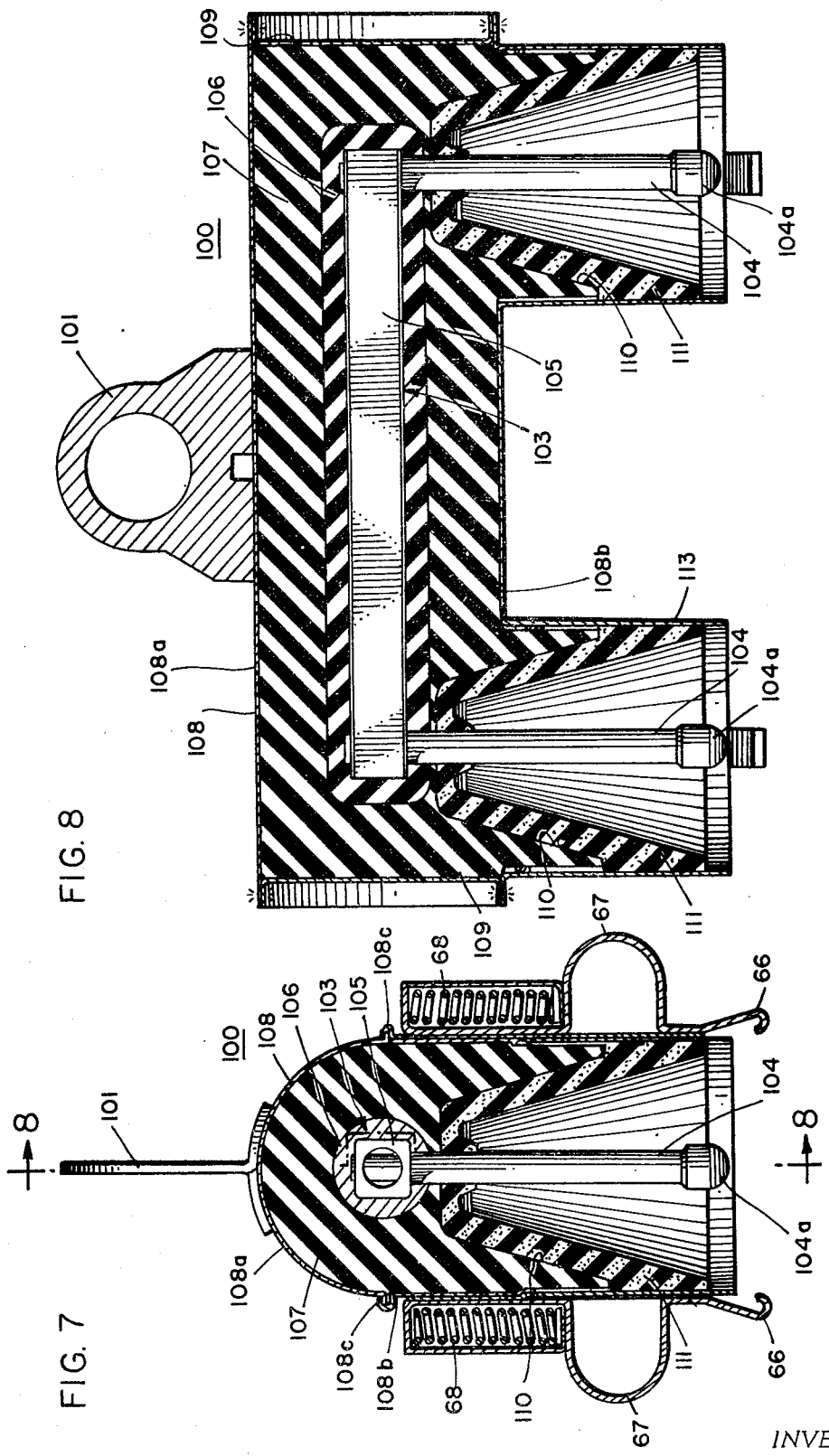

INVENTOR:
EDWARD H. YONKERS

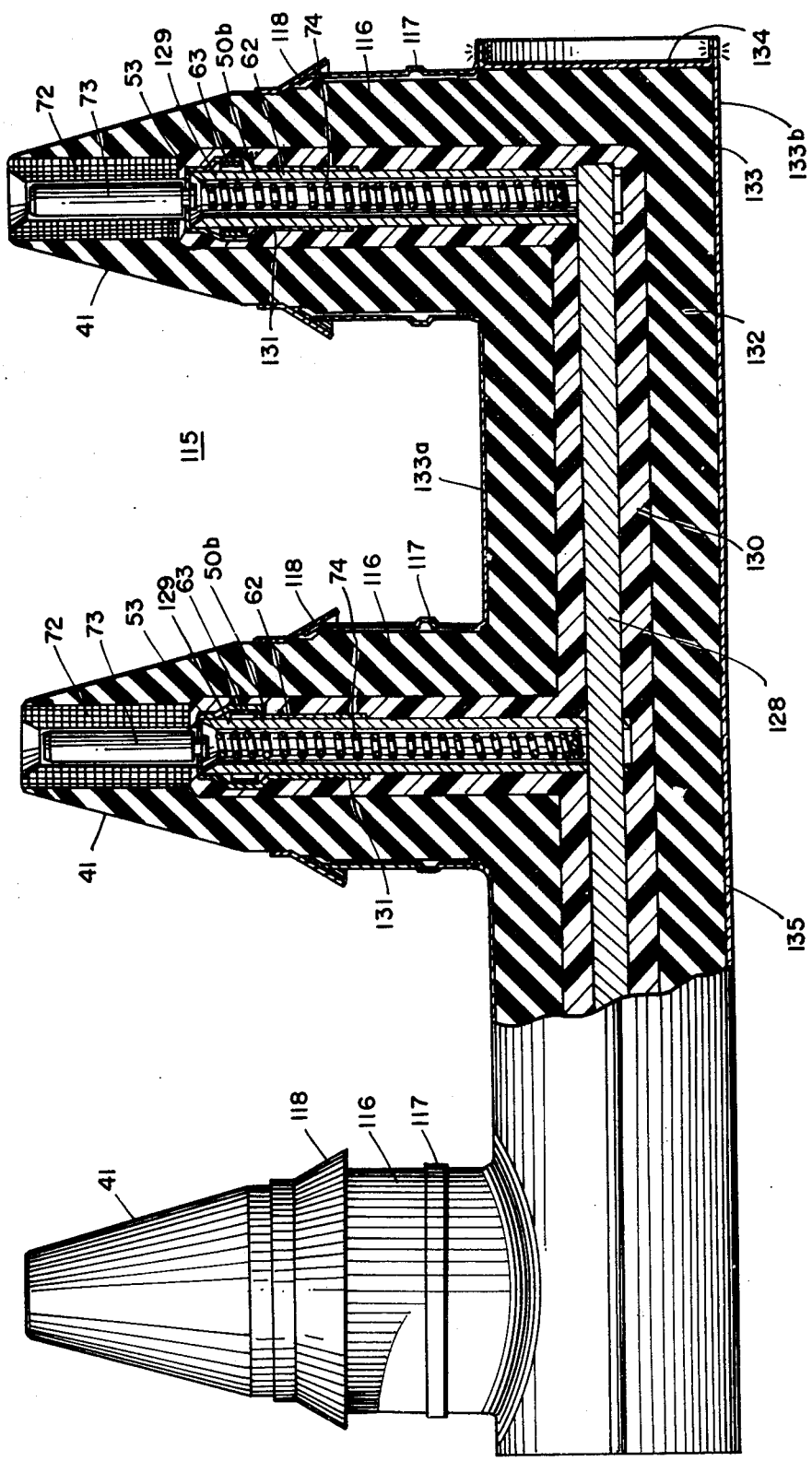

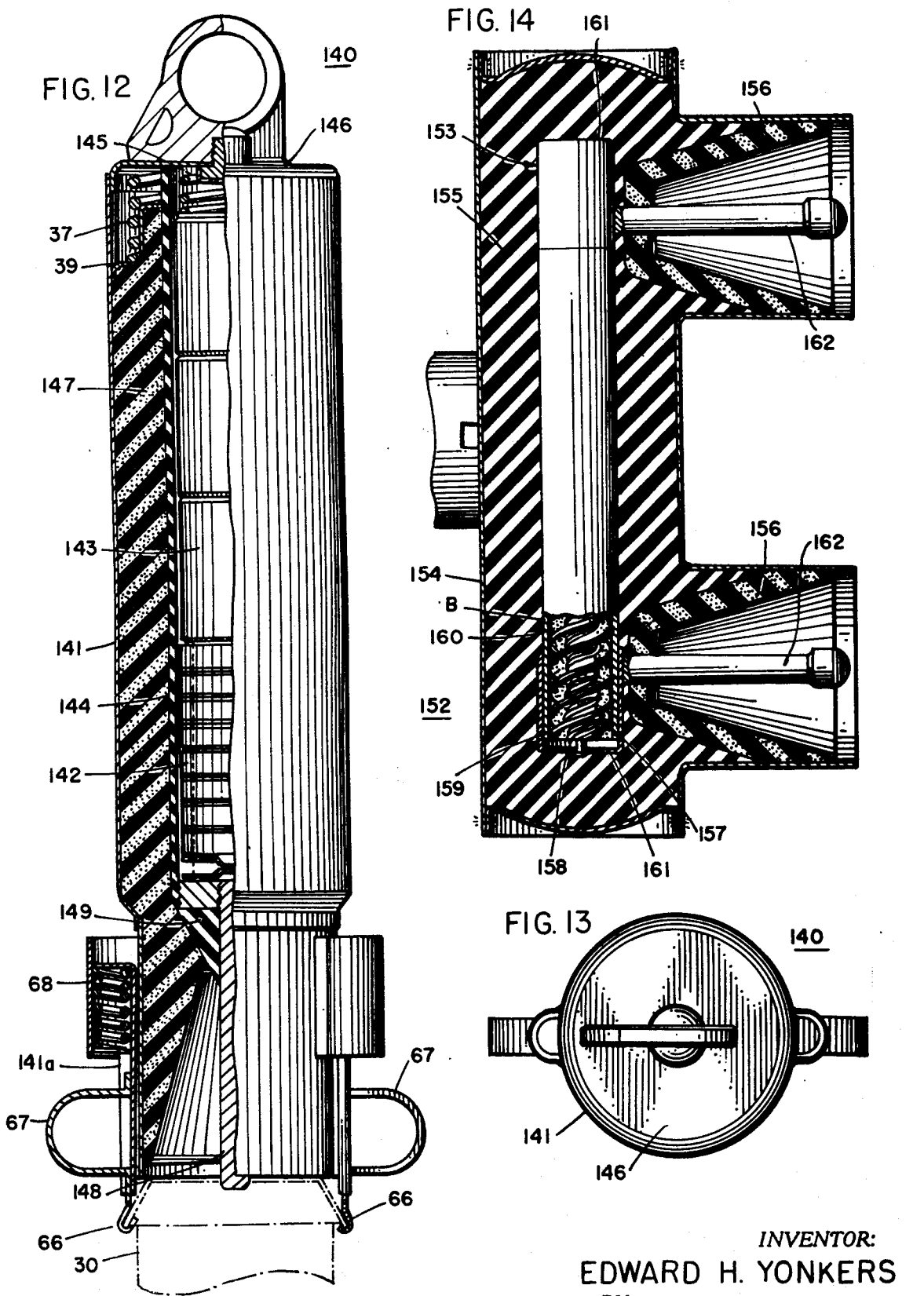

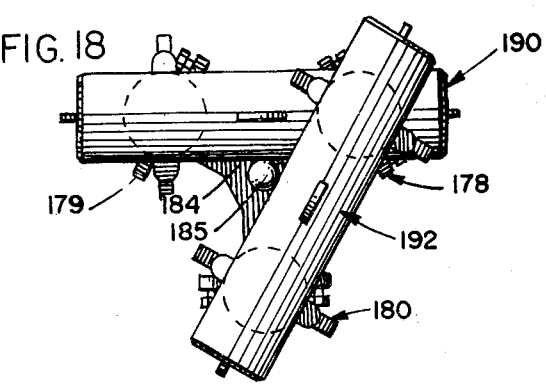
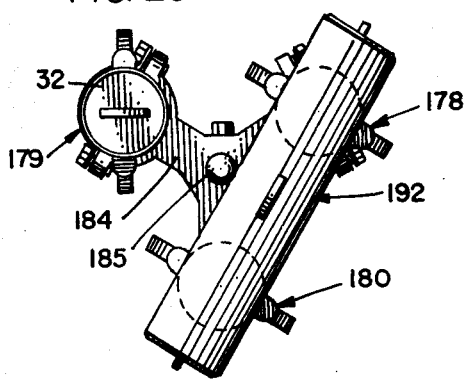
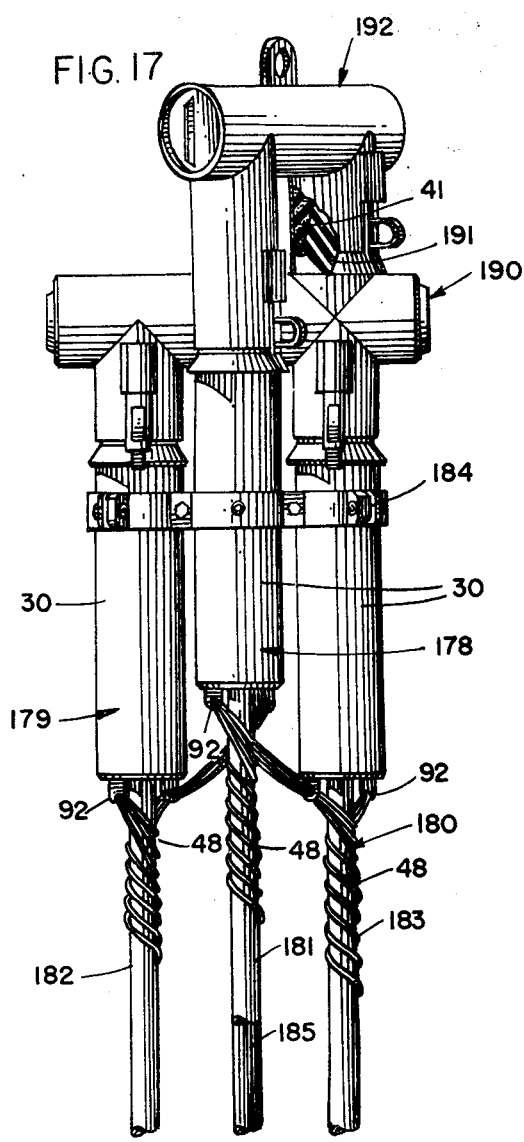
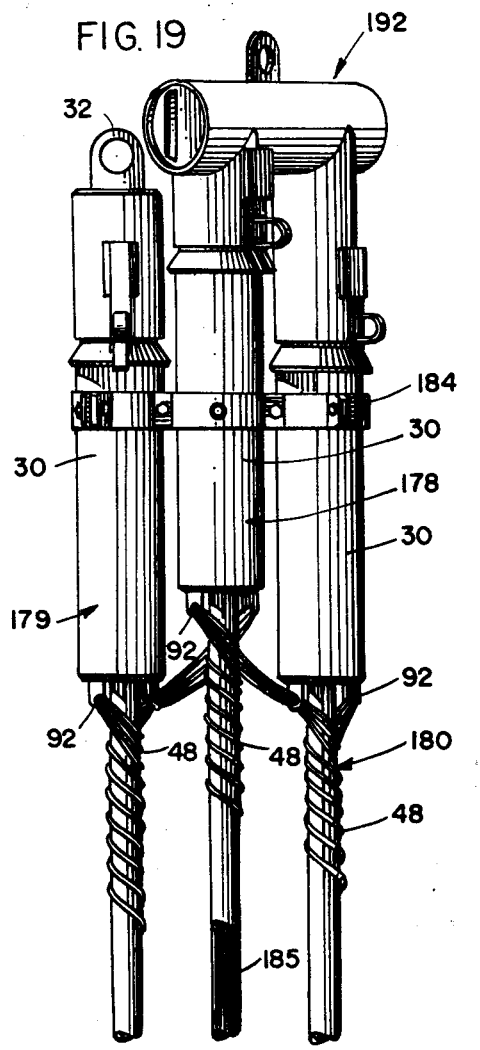

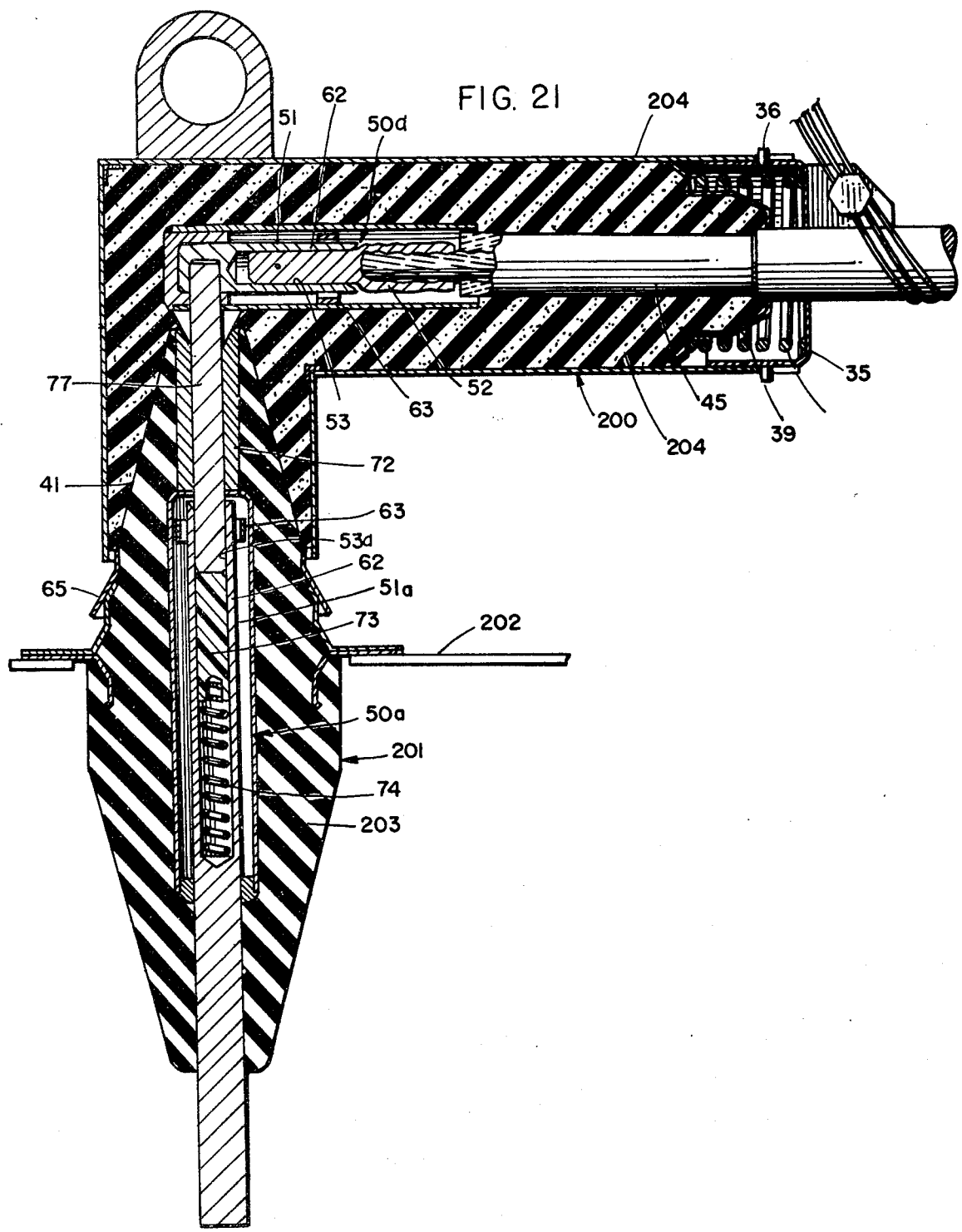

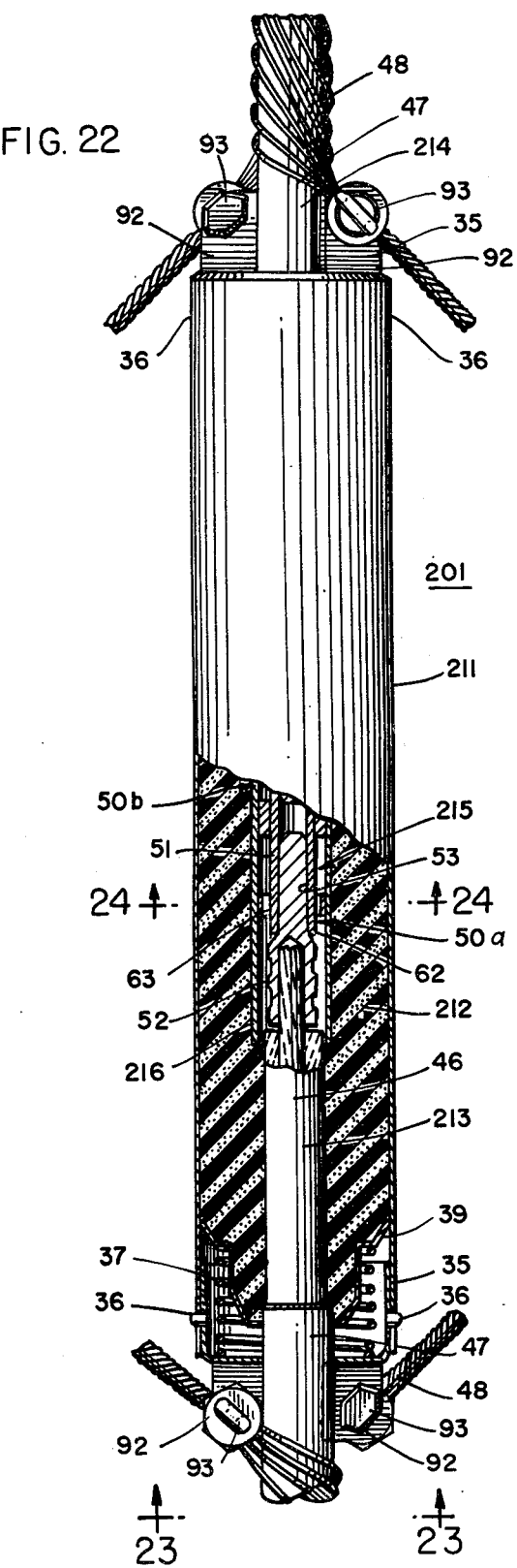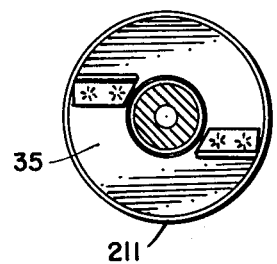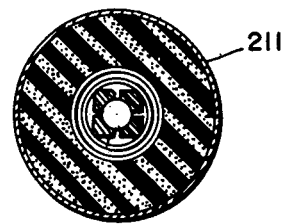

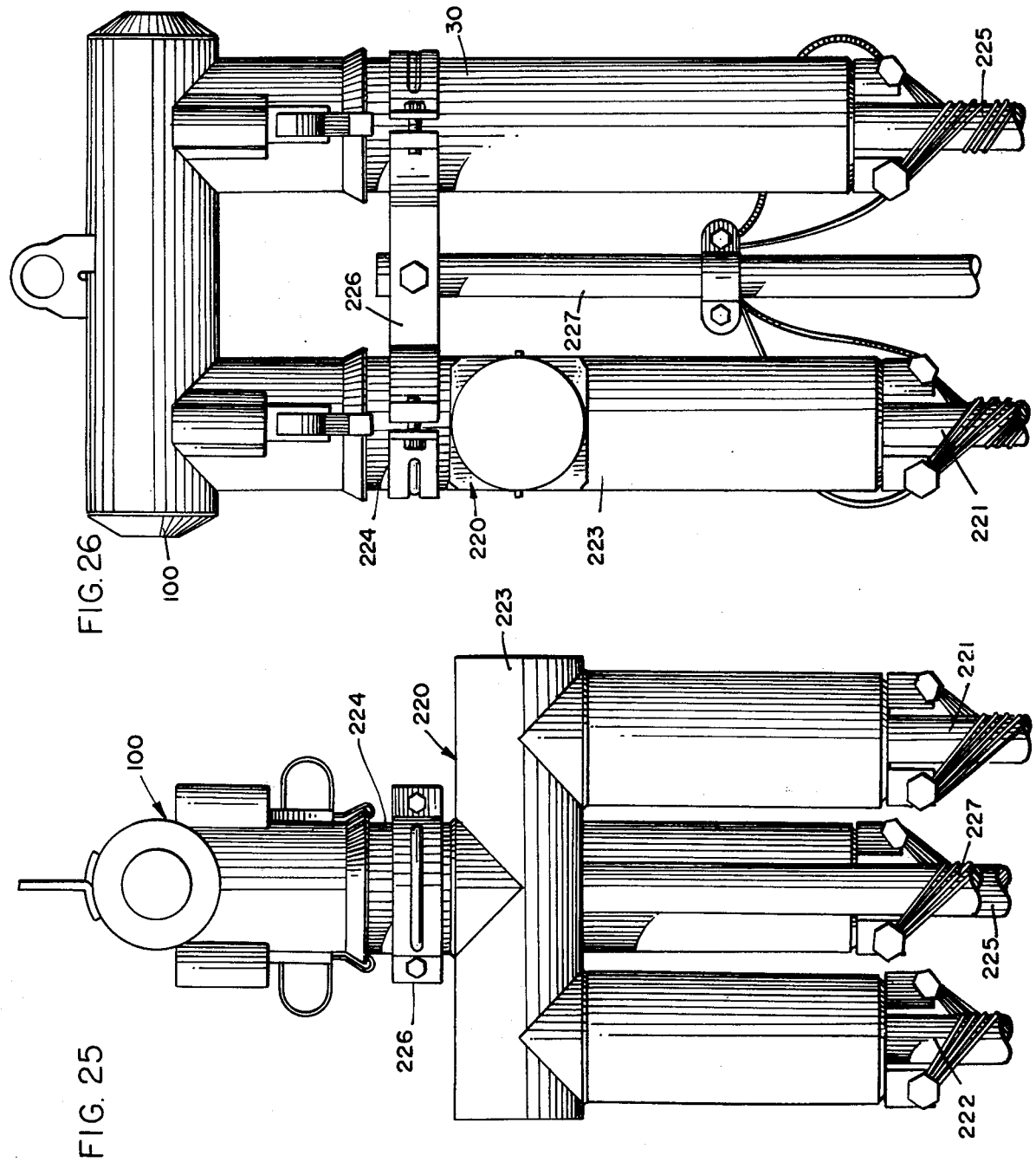

INVENTOR:
EDWARD H. YONKERS

GROUNDED SURFACE DISTRIBUTION APPARATUS

The present application is a divisional application of patent application Ser. No. 4,396, filed on Jan. 20, 1970. Patent application Ser. No. 4,396 is a continuation application of patent application Ser. No. 660,748 filed on Aug. 15, 1967 and now abandoned.

The present invention relates to a new and improved grounded-surface distribution apparatus and system for underground installation such as required in loop and radial underground distribution systems. More particularly, there is provided unique cable-terminal load-break switch elements which make possible hot-stick disconnecting, switching, sectionalizing and the like without moving the cable or the cable terminals and providing visible separation between grounded-surface circuit elements.

The present strong trend toward underground distribution of electricity brings with it the need for new kinds of associated apparatus to provide the necessary system functions including switches, fuses, surge arrestors, cable terminals, taps and joints. The new aspect of such apparatus is that it must be able to carry on its functions underground in contact with and at time under water. This means that every part of the circuit which is maintained at system potential must be surrounded by a continuous sheath of impervious, void-free insulation within a continuous conductive grounded housing.

Commerical apparatus attempting to fulfill these difficult requirements is still in the early stages of development. Prior known apparatus has not been entirely successful. In fact, the trend toward such underground distribution systems is so new that standard nomenclature has not been established by the electrical industry. The term "submersible" is sometimes applied to these devices for want of a more appropriate term. "Grounded-surface distribution apparatus" is a more appropriate and more truly descriptive term for this class of equipment since a conductive grounded-outside surface is a function requirement for operational and safety reasons.

The essential and main ingredient in underground distribution of electricity is obviously cable which must carry distribution current and voltage underground with trouble-free long life performance. Recent developments in synthetic dielectric materials have made possible the production of solid polymer insulated cable with high performance and low cost. However, the advantages of the new cable cannot be realized fully without effective, safe and convenient means for connecting the cable to various devices required in underground distribution systems. By employing voltage grading and interfacial sealing techniques, it has been possible to provide grounded-surface submersible devices to perform functions of cable joining and terminating, load-break switching, sectionalizing, and fusing.

The term "grounded-surface" may be taken literally in that apparatus in this category does in fact have a grounded external surface preferably of metal thick enough to provide mechanical support and to carry fault current if it occurs. Conductive plastic coatings will perform part of the function of grounding the surface but they may not provide safety undr fault conditions.

Thus, it is an object of the present invention to provide a new and improved grounded-surface distribution system.

A further object of the present invention is the provision of a new and improved distribution system suitable for underground and submersible installation.

A further object of the present invention is the provision of a new and improved cable terminal for a grounded-surface distribution system.

A further object of the present invention is the provision of a new and improved coupler for a distribution cable.

A further object of the present invention is the provision of a new and improved load-break coupling suitable for grounded-surface distribution system application.

Yet a further object of the present invention is the provision of a new and improved arrangement of taps and connecting units for an underground distribution system.

A further object of the present invention is a new and improved surge arrestor for a ground-surface distribution system.

Another object of the present invention is the provision of a new and improved fuse structure for a grounded-surface distribution system.

The difficult design problem in grounded-surface distribution apparatus is to put the entire high potential circuit inside the grounded housings and still provide means for carrying out switching and sealing-off functions. In accordance with the present invention there is provided a system which employs a combination of soft and hard dielectrics cast into place around the high voltage elements with compression springs at appropriate locations to maintain all critical interfaces void-free and under pressure over all ambient variations expected in operation.

In accordance with one aspect of the invention each circuit is maintained separately in its own grounded sheath with interfitting components available to set up various functions such as load-break disconnect. In this case the two cable terminals are supported by a rigid clamp mounted on a ground rod. The load-break features are present in both cable terminals independent of each other. The switch blade is a grounded-surface inverted "U" coupling which may be removed with a hot stick from above. The operator moves only the coupling piece. The cables and terminals are not moved or disturbed in the operation. The energized circuits are never exposed since loadbreak followers fill the connector openings when the switch is open. The open circuits are visibly separated and metallic grounds are between them. Insulated or grounded caps can be secured or latched over the elements of the open switch, if desired. Thus, the switch whether open with separate caps or closed with the "U" coupling, is completely safe and without hazard to operating personnel working in close proximity to it.

In accordance with another aspect of the present invention, the more complicated arrangements carry the same features of system security, operating convenience and safety. For example, a three terminal tap switch arrangement according to the present invention is very effective in loop systems where sectionalizing is needed.

In accordance with the present invention a grounded-surface current-limiting fuse provides system security when used in the tap circuits.

An improved surge arrestor provides convenient means for surge protection of the open position in loop circuits. Such a surge arrestor is also equipped for installation or removal with a hot stick.

The basic element of the present grounded-surface distribution apparatus is the cable terminal. It performs several important functions: (1) connection to the cable conductor, (2) grading of the field and provision of a permanent seal over the cable insulation, (3) provision of a disconnect and load-break element, (4) provision of a standard conical sealing surface to mate with various elements such as couplers, fuses, insulating and grounding covers, and (5) to provide interfitting of various elements having high versatility in meeting circuit requirements by means of a rigid cylindrical housing of stainless steel with locating means in precise bracket structures. All of the interfitting elements employ the same standardized conical sealing surface and latch spring geometry. The grounded cover of the cable terminal is latched into place providing the standardized conical seal which is waterproof due to the void-free interface held under permanent pressure by the latch springs.

In accordance with one aspect of the invention wherein a "U" coupler is latched in place between two cable terminals, the "U" coupler may readily be removed with a hot stick to provide load-break disconnecting. The "U" coupler and associated load-break terminals easily meet the usual requirement encountered with single phase distribution systems. The concentric neutral wires of the cable are connected directly to the cable terminal housing and serve to hold the cable in place by means of split bolt connectors, then continue on to be connected together and to ground. This firm connection is particularly important where system fault currents are high.

The present devices are particularly well adapted for sub-surface switching points or control centers. In such control center arrangements the loop can be separated and part of it temporarily grounded with a grounded cover and also it may be sealed off in the open position with an insulating cover or a surge arrestor. Versatile components thus provide means for safely controlling, protecting and servicing underground single phase loop or radial systems. Maximum safety is afforded to operating personnel by virtue of the continuous ground sheath which covers all energized elements with rugged stainless steel which can carry the high fault currents which sometimes occur in distribution systems.

Another safety feature which is inherent in the grounded-surface system is that open circuit positions always provide visible separation with solidly grounded elements between the separate circuit terminals. Thus, when all circuit terminals are sealed and latched with couplers, fuses, arrestors, covers or the like as required, the sub-surface control centers provide the maximum in circuit reliability, the minimum in customer outages, and maximum in safety and convenience for servicing.

For a better understanding of the present invention, reference may be had to the accompanying drawings wherein:

FIG. 1 is an isometric view of a cable terminal with a grounding cap in place according to the present invention;

FIG. 2 is a cross sectional view of the cable terminal of FIG. 1, and illustrating the electrical coupling components within the cable terminal;

FIG. 3 is a cross sectional view of the cable terminal of FIG. 1, taken along line 3—3 of FIG. 2, and illustrating the plug-in connector components within the cable terminal;

FIG. 4 is a cross sectional view of the connector coupling components of FIG. 3, illustrated to a larger scale;

FIG. 5 is an exploded view of the coupling of FIGS. 3 and 4;

FIG. 6 is an isometric drawing illustrating a grounded-surface load-break switch employing two standard load-break cable terminals and a standard "U" coupler.

FIG. 7 is a cross sectional view of a "U" coupling unit taken along line 7—7 of FIG. 6;

FIG. 8 is a cross sectional view of the "U" coupling unit of FIG. 7, taken along line 8—8 of FIG. 7, assuming that FIG. 7 illustrates the entire structure;

FIG. 11 is an elevational view of a three-point manifold or bus of the type illustrated in FIGS. 9 and 10, illustrated in broken away section;

FIG. 12 is an elevational view of a surge protector for use with a cable terminal according to the present invention and illustrated partially in broken away section;

FIG. 13 is a top view of the surge protector of FIG. 12;

FIG. 14 is a cross sectional view of a current limiting fuse for use with terminals according to the present invention;

FIGS. 17 and 18 illustrate an alternate control center arrangement including a connecting unit having multi-level terminals to provide desired economy of space and apparatus;

FIGS. 19 and 20 illustrate the isolating or grounding of one of the lines in the control center of FIG. 17;

FIG. 21 illustrates in cross section a primary cable terminal for the grounded surface submersible system according to the present invention;

FIG. 22 illustrates in broken away section a cable joint according to the present invention;

FIG. 23 is an end or bottom view of the cable joint of FIG. 22 taken along line 23—23 of FIG. 22;

FIG. 24 is a cross sectional view of the cable joint of FIG. 22, taken along line 24—24 of FIG. 22;

FIGS. 25 and 26 illustrate a switching point assembly employing an improved "T" terminal.

Figure 9:
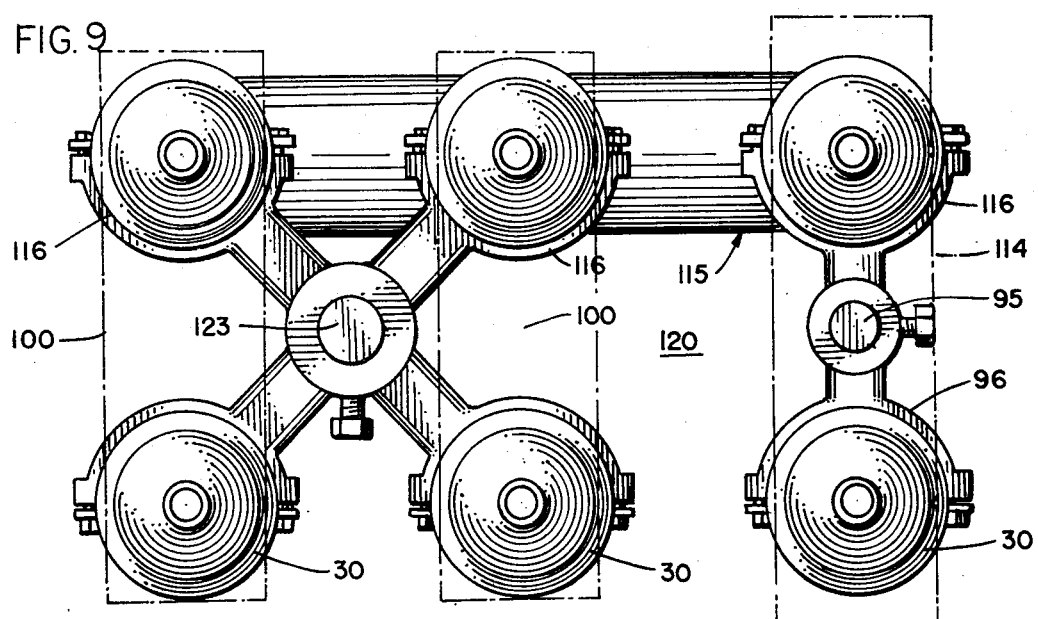
FIG. 9 is a top view of a single tap arrangement employing three load-break cable terminals, and a tap manifold or bus in accordance with the present invention.

Referring now to the drawings and particularly to the embodiment of FIGS. 1, 2 and 3, there is shown the details of a cable terminal 30 with a grounding cover 32 latched in sealed position. The cable terminal 30 includes a conducting housing 34 of suitable material such as stainless steel, and cylindrical in cross section. A cover 35 also of conducting material such as stainless steel engages two side pins 36 in the housing 34 in a spiral bayonnet action to compress an inner thrust spring 37 to be compresed in the latched position as shown so as to exert an axial thrust on a soft elastomer dielectric filler 38 confined at its lower end by a piston-like cup retainer 39.

The soft dielectric filler 38 is cast within the housing 34 to interfit with a hard dielectric filler 40 which is firmly cast and locked into the housing 34 but which projects from the end of the housing to provide a standardized conical sealing surface 41 having a connector entrance 42. Although the hard dielectric filler 40 is illustrated as formed of two parts 40a, and 40b, it may be made of one piece if desired.

As used herein, the soft dielectric filler may be of any void-free dielectric soft enough to conform to the adjacent surfaces in void-free interfacial engagement under the loading of the selected thrust spring. It has been found that a soft poly-urethane or other limited cross linked polymer, preferably castable, with a Shore A hardness of 20 to 40, worked satisfactorily. As used herein, the hard dielectric filler may be of any void-free dielectric hard enough to provide mechanical strength to position the components. Castable synthetic polymers such as epoxy resins having a Shore A of 100 or higher were found satisfactory.

The soft dielectric filler 38 is designed to receive a power cable 45 of the type having a basic insulation 46 and a sheath 47 as customized dimensions. In addition to the sheath 47, the cable 45 may contain a plurality of strands of grounding wire 48. The end thrust spring 37 permits a resonable range in diameter variation and still maintains a permanent void-free interfacial seal between the insulation 46 and the soft elastomer 38 even under submerged conditions.

The cable terminal 30 includes a connector 50 for terminating the end of the cable 45 and defining a cable connector 50a at one end. The cable connector 50a has an elongated body of conducting material, such as copper and the like, and defines a receptacle 51. A conducting pin or plug 52 is adapted for insertion into an elongated axially aligned pin cavity 53 of the receptacle 51 to establish a low resistance connection capable of carrying rated current as well as momentary high currents. The pin 52 is connected to the short exposed end 45a, FIG. 2, of the cable 45, and the pin 52 is formed with an elongated axially aligned socket 54 extending inwardly from the lower end of the connector. After the central conductor 45a is inserted into the socket 54, a compression tool or the like is used to compress the walls of the socket inwardly into tight engagement with conductor 45a and thus firmly secure and electrically connect the pin 52 to the upper end of the cable 45. The pin 52 includes a cylindrical pin portion 55 of reduced diameter adapted to be inserted into the pin cavity 53 of the receptacle 51 to establish electrical connection therewith.

The receptacle 51 around the pin cavity 53 thereof is square or paragonal in cross section, FIG. 3, and includes a plurality of planar outer faces 58 which angularly intersect one another, forming a plurality of longitudinally extending parallel upper ridges 59. Preferably, the ridges are provided with narrow, flattened upper faces 59a, FIG. 4, which are tangent to a circle having its center on the longitudinal center axis of the receptacle 51. Each planar face 59a of the receptacle 51 is bisected by a longitudinally extending slot 60 extending upwardly from the lower end of the connector and terminated adjacent the inner end of the pin cavity 53. The slots 60 bisect the faces 59a into pairs of segments of approximately equal area, and thereby form a plurality of movable fingers 62, each including one of the ridges 59 and a pair of segments on its outer surface and a curved segmented, cylindrical interface forming a wall portion of the pin cavity 53. The free ends of the fingers 62 are movable inwardly and outwardly with respect to the longitudinal central axis of the receptacle 51 and form the lower end portion thereof surrounding the pin cavity 53.

In order to establish a relatively high contact pressure between the fingers 62 and the pin 52 and thereby further reduce the resistance of the connection and increase the current carrying capacity thereof, the fingers 62 are biased inwardly by a circular tension ring 63 which is slipped over the body of the receptacle 51 and bears against the flattened surfaces 59a on the ridges 59. Preferably, the ring 63 is formed of a thin band of high strength material, such as beryllium-copper alloy and is dimensioned so that the inner diameter of the ring is slightly less than the distance between the flattened surfaces on the ridges 59 on the diametrically opposite fingers. Accordingly, the ring 63 is under tension and is force fitted over the lower end of the body and moved upwardly thereof toward the blind end of the pin cavity 53.

The amount of inwardly biasing force exerted on the fingers 62 by the ring 63 is selectively adjustable by movement of the ring 63 around the fingers of the receptacle 51. For example, the fingers 62 are more easily deflected near the outer or free ends, and when a ring of given internal diameter is positioned adjacent the free end, the fingers 62 have less inward deflection of the free ends than when the ring 63 is moved upward toward the blind end of the pin cavity 53. The flattened surfaces of the ridges 59 permit easier movement of the ring 63 thereof without gouging of the ridges.

From the foregoing, it should be noted that the cable connector 50a provides a large contact surface between the connecting members thereof and additionally provides for an adjustable contact pressure over the large contact surface. It is not necessary to tighten any bolts or clamps for assembling the cable connector once the connecting members are engaged since ample holding force is achieved by the contact pressure between the connecting members. While the receptacle 51 is illustrated as having a square cross section, it is to be understood that other configurations, such as triangular, etc., could be used as well. The fingers 62 are constructed to have a cross section that is symmetrical on opposite sides of longitudinally bisecting planes extending between the ridges 59 and the longitudinal axis of the cable connector 50. Accordingly, the inward force applied by the ring 63 to the flattened ridge surfaces is distributed fairly uniformly on both sides of the bisecting plane to the inner contact surface of the fingers 62.

The upper end of the tubular housing 34 carries a conical skirt 65, FIG. 2, so that a pair of spring latches 66 carried on the grounding cover 32 can engage with the conical skirt 65 in any radial direction. The spring latches 66 include latch loops 67 designed to be engaged by standard hot line tools for latching or unlatching the various devices which carry the standardized mating surfaces and latching elements. Suitable latch springs 68 maintain the spring latches 66 in tight assembled relation.

The connector 50 also includes a switch connector 50b for interrupting a circuit under load. The switch connector 50b includes the same components as the cable connector 50a but additionally has arc-extinguishing components. Specifically, the switch connector 50b includes a switch receptacle 51a defining a switch cavity 53a formed by the fingers 62. The tension ring 63 affords inward pressure to the fingers 62 in like manner as in the cable connector 50a. The switch connector 50b will accommodate a coupling conductor or switch member to provide an excellent electrical connection.

To provide for load-break features, the upper connector opening carries a liner 72 of arc extinguishing material which co-functions with a follower 73 of arc-extinguishing material within the switch cavity 53a of the switch receptacle 51a and which is backed up by a projection spring 74 to provide load-break effects when an associated coupling conductor is removed from the switch receptacle. The material of the liner 72 and follower 73 possesses desired arc-quench properties any may be of synthetic polymer material carrying a suitable amount of arc-quenching material such as molybdenum sulfide or alumina.

In operation the follower 73 moves into the opening in the liner 72 when a coupling conductor 77 of the grounding cover 32 is removed from the associated switch cavity 53a. The cooperation of the arc-quenching elements 72 and 73 extinguishes any arc that may be formed as the coupling conductor 77 leaves the end of the switch connector 50 by de-ionization of the plasma. Since the arc is interrupted in the narrow space between the follower 73 and the liner 72 and since the follower 73 remains in the opening, there is no significant amount of ionized gas between the separated circuit elements. That is, the ionized gases associated with the receptacle side of the circuit remain inside and those associated with the connector side of the circuit are dissipated on the outside.

The connector 50 is in a receptacle chamber 80 in the relatively high potential field associated with the cable conductor. This region would therefore be subject to corona problems unless all the air spaces around the receptacle are eliminated. This is accomplished according to the present invention by applying a conductive layer or member 81 to the inside wall of the chamber 80. If desired, the conductive layer 81 may be a conductive paint or coating.

The inside wall of the receptacle chamber 80 includes two peripheral grooves 82 and 83 of semi-circular cross section, one 82 at the cable entrance end which serves to reduce the voltage gradient at the end of the conductive layer 81 because of the enlarged radius of curvature provided by the conductive surface of the groove, and one 83 generally centrally of the receptacle chamber 80 which serves to lock the connector 50 in proper position in the chamber by means of a metallic spring ring 84. The ring 84 also serves to connect electrically the conductive layer 81 to the connector 50.

The outer surface of the hard dielectric filler 40 is also provided with a conductive layer or member, shown in the form of a conductive coating 85 in the regions where it is normally in contact with the metal housing 34. This is to prevent ionization of air in the small gap between the inside surface of the housing 34 and the outside surface of the filler 40 which may occur due to difference in the thermal expansion coefficients of the two materials. This problem of differing thermal coefficients of expansions also occurs between the soft dielectric filler 38 and the metal housings 34 and retainer 39. However, in these locations the action of the latch springs 68 and the thrust spring 37 on the soft elastomer keeps all of the critical interfacial surfaces in void-free contact throughout the ranges of expected ambient temperatures and operating conditions.

The grounding cover 32 serves to provide a positive ground to a cable terminal 30 when it is desired to work in the area of a disconnected terminator. To this end, the coupling conductor 77 of the grounding cover is electrically connected to a metal grounding housing or cap 88 which in turn is grounded to the spring latches 66 and the conical skirt 65 to the grounded conducting housing 34 of the cable terminal. However, an additional ground connection is recommended to the grounding cap housing by means of a flexible ground wire connected to the terminal 88b. A soft dielectric filler 90 fills the grounding cap around the coupling conductor 77 and forms a void-free interfacial engagement with the conical sealing surface 41 of the cable terminal. As heretofore described, the latch springs 68 serve to maintain a permanent void-free interfacial seal between the critical interfacial surfaces in a manner similar to the thrust spring 37. Thus, there is provided the standard conical sealing assembly with the hard dielectric filler 40 having a convex sealing surface 41, while the mating soft dielectric filler 90 has a concave mating surface 91, which, in the illustrated embodiment, are both conical in shape.

The structure shown in FIGS. 1, 2 and 3 is particularly adapted to receive the co-axial cable 45 which employs the plurality of wires 48 arranged in symmetrical spirals over the outside surface of the cable. These wires serve as the neutral conductor of the circuit as well as a grounded protective sheath. Since these wires 48 are part of the power circuit, they must provide a high conductivity path throughout the circuit. For this reason, the lower cover 35 is provided with extension members 92 which receive split both connectors 93 for holding the strands 48 of the neutral conductor so as to make connection and at the same time hold the cable firmly in place. The neutral wires 48 can then continue on to be grounded to ground or other neutral wires as hereinafter described. The extension member 92 also serves as means for rotating the cover 35 into the closed and latched position.

FIGS. 6, 7 and 8 illustrate a simple typical switch connection between two cable terminals of the type heretofore described. As therein illustrated, a pair of cable terminals 30 identical to that heretofore described, are supported in spaced relation from a grounding rod 95 by a suitable mounting clamp 96. The mounting clamp 96 is precisely machined to match the diameter of the terminal housing 34 and includes a groove 97 accommodating a rib 98, FIGS. 1 and 2, which is precisely located on all of the terminal housings 34. The mounting clamps 96 are slotted with grooves 97 so as to fit the rib 98 whereby all of the terminals 30 are rigidly held in place at the proper level with respect to the mounting clamp 96. Thus, all terminals 30 in a single mounting clamp will be normal to the plane of the bracket, at a standard distance apart and at a standard level permitting complete interchange of removable components.

As best illustrated in FIG. 6, the neutral wires 48 of the cables 45 are divided into two parts, one half going to one extension member 92 and the other half to the other extension member 92 of a respective terminal 30. This is done in order to balance the forces holding the cable in place and also to keep all of the neutral wires tight and uniformly covering as much of the cable sheath as is possible. A grounding clamp 99 on the grounding rod 95 serves to join all neutral wires together and to connect them to ground.

The pair of cable terminals 30 in FIG. 6 are connected by a U-shaped switch control 100, also illustrated in FIGS. 7 and 8, and provided with a loop 101 for engagement with a lineman's hot stick. The switch coupler 100 includes a central conducting assembly made up of two switch couplings or pins 104 serving as switch blades and braised or otherwise secured to a crossbar 105 formed of electrically conducting materials such as copper. The switch couplings are silver-plated and carry a switch tip 104a which is controlled in size so as to fit the switch cavity 53a in the mating cable terminal. The horizontal portion of the central conducting member carries a cylindrical molding of conductive plastic or other suitable material 106 to enlarge the radius of the conductive portions and reduce the potential gradient. This cylindrical molding of conductive material 106 eliminates corona problems from air gaps in high gradient regions which could develop due to differences in thermal coefficients of expansion between plastics and metals. With this construction the field starts at the outer surface of the conductive material 106 which is surrounded in bonded, void-free relationship with a hard dielectric filler 107 of the same expansion coefficient as the conductive material 106 so as to remain sealed at all temperatures. The entire assembly is enclosed within a conductive housing here illustrated as a stainless steel housing 108, formed of mating housing portions 108a and 108b, so that the filler assembly including the contact plugs 104, crossbar 105, conductive material 106, and hard dielectric filler 107 may be prefabricated and then assembled within the housing. The housings portions 108a and 108b may be gripped in place together such as by the overlaps 108c. The housing 108 is closed by end caps 109 which may be spot welded into position as shown.

The standardized conical sealing surface 41 of the cable terminal 30 must be mated with a soft dielectric in order to establish the void-free interface under the spring forces of the standard latch system. This is accomplished by providing conical cavities 110 around the switch coupling 104 in the dielectric filler 107 which are larger than the standardized conical sealing surface 41. A soft dielectric molding 111 is performed with the exact geometry of the space between the conical cavities 100 and the conical sealing surfaces 41 to provide the standard conical sealing surface 91. The soft dielectric fillers 110 are formed of double cones bonded to the hard dielectric filler 107 on the coupler 100 to provide a permanent void-free interface between the hard and soft dielectrics in the coupler 100. Each of the downwardly depending portions of the coupler housing are provided with a pair of latch springs 66 at the ends of latch loops 67 and adapted to be loaded through latch springs 68 in the manner described in embodiment of FIGS. 1, 2 and 3.

Figure 10:
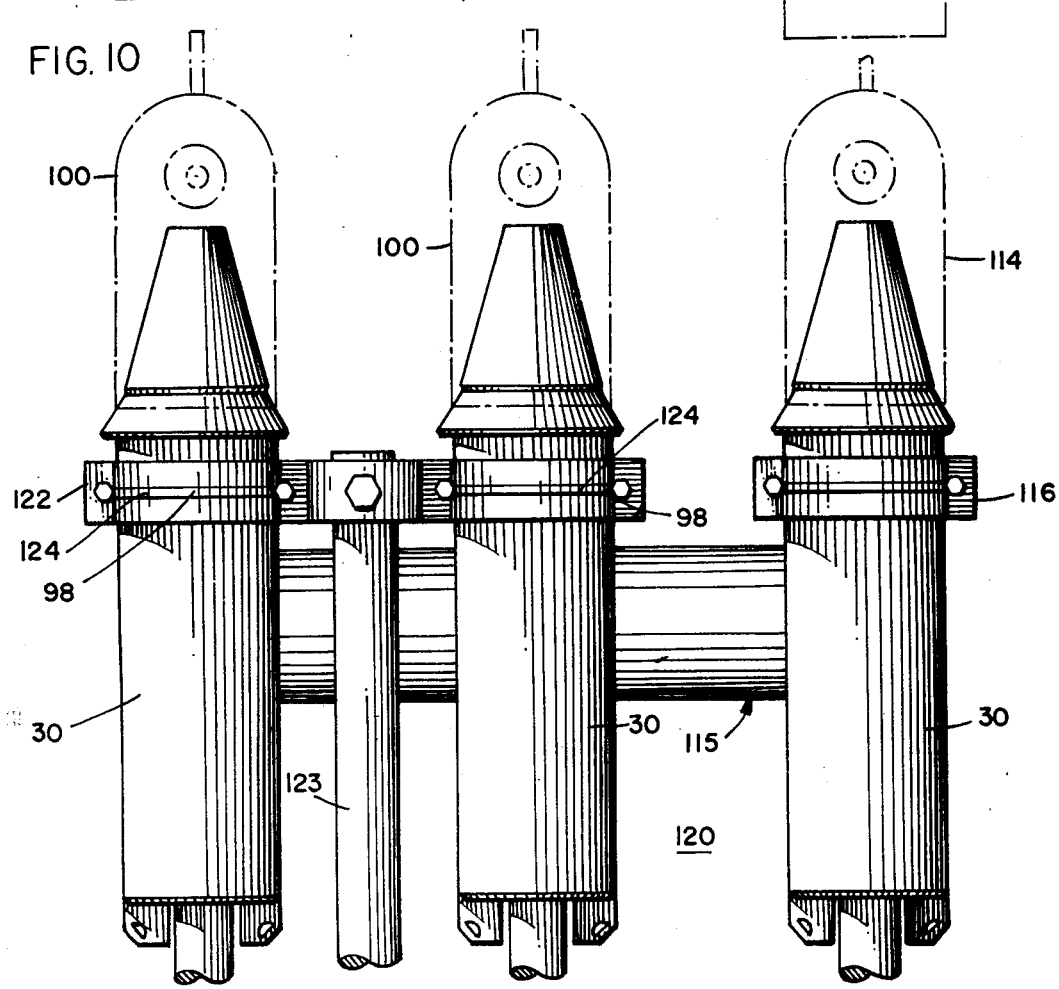
FIG. 10 is an elevational view of the structure of FIG. 9 and further illustrating "U" couplers in phantom.

By the proper selection and arrangement of grounded surface elements, a variety of important distribution system functions can be performed according to the present invention. FIGS. 9, 10 and 11 illustrate, for example, an assembly 120 of standard elements arranged so as to provide a single fuse tap, illustrated in phantom at 114, on an underground distribution loop circuit. Sectionalizing functions are provided by means of two switch couplers 100 of the type illustrated in FIGS. 6 to 8. The necessary interconnections are established by means of a three terminal manifold or bus 115 and three cable terminals 30. Each cable terminal 30 is identical with that of FIGS. 1, 2 and 3. In addition, the manifold 115, as illustrated, is provided with three vertical risers or cable terminals 116 each containing similar load-break features. Thus, each riser 116 is an exact replica in form and function as the upper end of the standard cable terminal. Each riser housing includes a locating rib 117, and latching cone 118 so that all removable components will interfit. Thus, one of the risers 116 and one of the cable terminals 30 are tied together by the mounting clamp 96 onto the grounding clamp 95. The remaining two vertical risers 116 and cable terminals 30 are connected by a 4-place mounting clamp 122 secured to a grounding rod 123. Each of the clamping portions of the mounting clamp 122 is provided with a circumferential groove 124, FIG. 10, receiving one of the locating ribs 98 and 117 to vertically position the respective terminals.

The design details of the multi-terminal manifold 115 will be more clearly understood by reference to FIG. 11. As therein illustrated, the manifold 115 includes a central conductor 128 which may be of copper or other suitable material. Standard switch connectors 50b, identical with the switch connectors 50b of the connector 50 illustrated in the embodiment of FIGS. 1, 2 and 3, are braised to the central conductor 128. Briefly, therefore, the switch connectors 50b each include the switch receptacle 51a provided with the switch cavity 53a for receiving a mating connector rod. As heretofore described, the switch receptacle 51a is similar to the switch receptacle 51a illustrated in FIG. 4 and 5 and include the plurality of fingers 62 encircled by the tension ring 63. The liner 72 of arc-quenching material leads into the switch cavity 53a, and the projectable follower 73 is biased into the liner 72 by the projection spring 74 when connecting components are not in place. It is understood that the load-break components including the sleeve 72, follower 73, and projecting spring 74 may be omitted where it is not desired to provide for breaking of the circuit under load.

In like manner as with the switch coupler 100 illustrated in FIGS. 7 and 8, a conductive material 130 is cast around the middle connecting circuit components thereby enlarging the radius of the conducting portion and reducing the potential gradient. Thus, there is eliminated the corona problems from air gaps in high gradient regions which could develop due to differences in thermal coefficients of expansion between the metal parts and the dielectric fillers. With this construction, the field starts at the outer surface of the conductive material 130. However, since the upper ends of the switch receptacle 51a in the region of the follower 73 must be movable, a soft cover 131 of plastic or other suitable material covers the free end of the switch receptacle 51a. A hard dielectric filler 132 is molded over the entire conducting system with the outside surfaces conforming to a housing 133 of stainless steel or other suitable material and with the standard conical sealing surface 41 of each riser position. The entire manifold assembly 115 may be performed and inserted into an upper housing portion 133a with a lower housing portion 133b slipped into position and with end caps 134 spot welded into place. As in previous components, the outside surface of the hard dielectric filler 132 is covered with a conductive layer 135 except on the conical sealing surfaces.

The risers 116 may be provided in any number; however, most circuit requirements can be met with three or four terminal manifolds. It should be noted that the risers are arranged in line and spaced the standard distance apart. Also, the vertical sleeve portions of the housing 133 are fully standardized to fit brackets and to mate with removable components. Thus, two four terminal manifolds can be combined to provide sectionalized switches and four fused taps in a single control center.

Surge production is frequently desired at the open end of a loop circuit or other suitable locations when it is to remain in this condition for a long period of time. FIG. 12 illustrates in partial cross section a surge arrestor 140 which may be connected to any of the standard terminals in a cluster or control center. The surge arrestor 140 includes a grounding housing 141 of stainless steel or other suitable material and includes a lower portion 141a which is standardized with the conical sealing surface 91 to the fit cable terminals and multiterminal manifolds of the grounded surface distribution system. According to the present invention, the functional parts of the surge arrestor 140 include a system of quench gaps 142 in series with valve blocks 143 of suitable material such as silicon carbide. These elements are arranged in a dielectric tube 144 under compression of a compression spring 145. The housing includes a top cover 146 locked to the remainder of the housing through side pins in like manner as cover 35 in the embodiment of FIGS. 1, 2 and 3. The space between the dielectric tube 144 and the metal housing 141 is filled with a soft dielectric filler 147 which is maintained in void-free interfacial contact by means of the inner thrust spring 37 acting between the end cover 146 and the retainer 39. A connector pin 148 extends from the lower end of the surge arrestor 140 for mating within the switch cavity 53a of a collaborating member. A cone of soft dielectric material 149 is placed around the upper end of the contact plug 148 in order to control the gradient in this region. It is understood that the connecting components of the lower housing 141a are identical to those heretofore described, including the spring latches 66, the latch loops 67, and the latch springs 68 which serve the dual function of biasing the spring latches 66 and applying a positive pressure to the dielectric filler 147.

To provide for fusing of the grounded surface distribution system, one of the interchangeable elements may consist of a current limiting fuse, such as the current limiting fuse 152, illustrated in FIG. 14. As therein illustrated, the current limiting fuse 152 is housed within an assembly similar to the switch coupler 100 more fully described in the discussion of FIGS. 7 and 8. More specifically, there is provided the fuse unit 153 enclosed within a metal housing 154, similar to housing 108 heretofore described, and cast in the center of a hard dielectric filler 155. A pair of conically shaped soft dielectric fillers 156 are provided having the standard conical sealing surfaces 91 for engaging the conical sealing surface 41 of cable terminals or manifolds, and the fuse 152 is provided with the standardized latches to interfit with the other components.

Referring now to the fuse unit 153, the operation thereof is known and depends upon the melting and vaporization of a silver fuse wire 157 and the subsequent deposition of the silver over the surfaces of sand grains 158 which surround it. This takes place so rapidly under high fault conditions that the current is cut off before it reaches the full value of the available fault current. The silver metal becomes so diffused in the sand grain matrix that it no longer carries significant current. In such fuses it is necessary to maintain sufficient distance between the turns of the silver wire to prevent hot ionized gas from shorting out turns. In the illustrated design, in order to minimize the length of the fuse for a given rating, a wide flange surrounding the spiral core 159 is used to separate the turns of the silver fuse wire 157. As previously mentioned, this space around the wire between the spiral flanges is filled with refractory granulars such as alumina or silica. The granular matrix may be bonded with a minimum of refractory cement in order to permit the assembly of the parts within an insulating tube 160. The tube 160 may be of organic or inorganic material, but preferably it is of high strength and refractory at least in its lining in order to minimize internal pressures which may develop during operation. This fuse has no outlet for gaseous discharge since its entire envelope must be capable of withstanding system voltages within the grounded housing. The respective ends of the silver fuse wire 157 is soldered to the center of opposed cylindrical ferrules 161 fitted over the ends of the surrounding spirals 159 and insulating tube 160. Thus, the silver fuse wire 157 may be of maximum length. A pair of contact rods or plugs 162 extend concentrically through the soft dielectric filler for engagement within a plug receiving cavity 153 of a conductor assembly 50.

In order to control the potential gradient around the turns of the fuse wire in the sand and thus prevent corona in this region, a conductive film is applied to the outer surface of the fuse tube 160. A terminal to terminal resistance in the range of 50 to 150 megohms provides satisfactory operation of the fuse.

Figure 15:
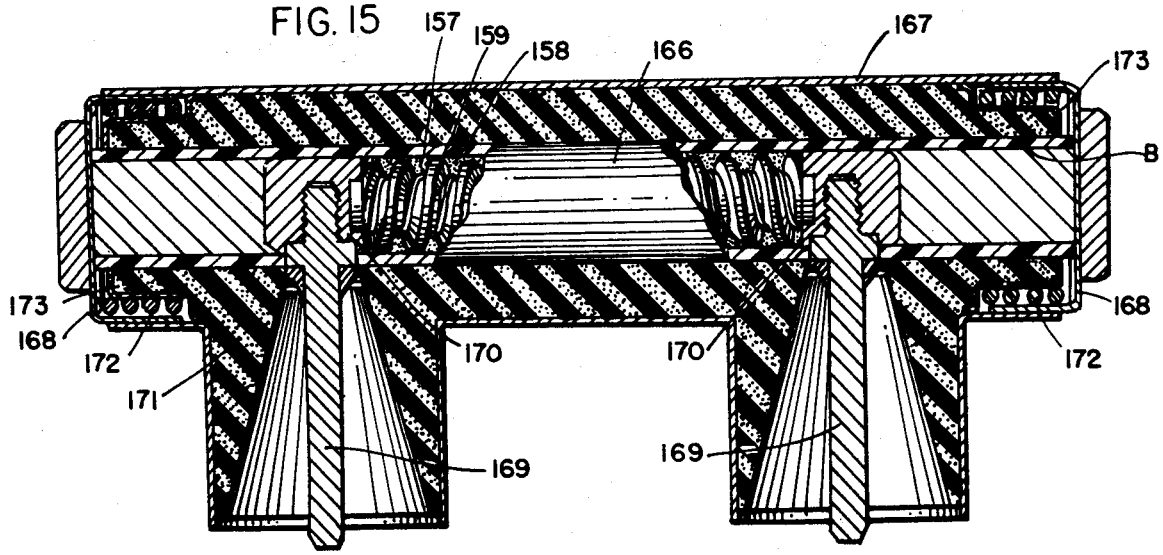
FIG. 15 is an alternate structure of a fuse connector for use with terminal taps according to the present invention and illustrating a removable fuse arrangement.
Figure 16:
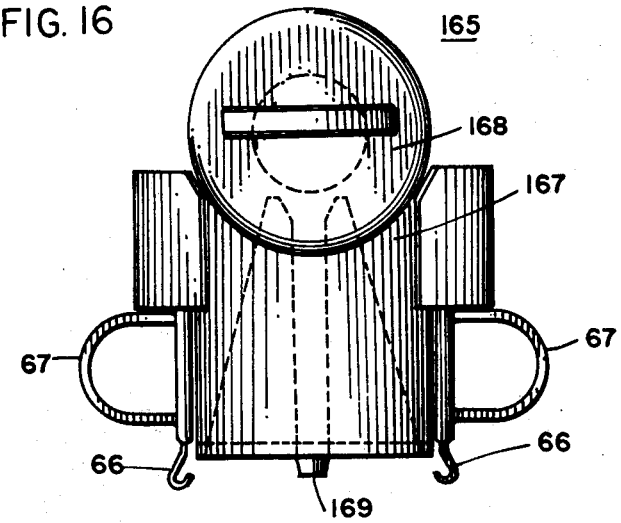
FIG. 16 is an end view of the fuse structure of FIG. 15.

In the above fuse design, the active fuse wire 157 is not removable in the field from the matrix of the hard dielectric filler 155. When blown, the fuse 152 will have some salvage value for factory rebuilding, but cannot be rebuilt in the field. FIGS. 15 and 16 illustrate a current limiting fuse 165 which, although somewhat more expensive initially than the fuse 152, may have the active element replaced by the user in the field, and the fuse unit 165 could go back into service immediately.

The principle of operation of the fuse 165 is similar to that of fuse 152 and includes the silver fuse wire 157 between the flanges of the spiral core 159 filled with suitable refractory granulars or sand grains 158. This active fuse element is housed within removable fuse cartridge 166 which can be removed from a metal housing 167 for replacement by releasing one or both of a pair of opposed end thrust spring covers 168 and unscrewing a pair of contact rods or plugs 169 from plug blocks 170. In the fuse 165, the entire space between the housing 167 and the fuse tube 166 is filled with soft dielectric filler 171 and is maintained in void-free contact by end thrust springs 172 interposed between the spring covers 168 and respective retainer cups 173. A bayonnet connection joins the spring covers 168 with the housing 167 in a manner similar to that illustrated in the embodiment of FIGS. 1, 2 and 3. The conical sealing surface 91 is maintained on the soft dielectric to engage the conical sealing surface 41 of a cable terminal, manifold riser or the like. The conical sealing surfaces are maintained in void-free contact by the latching system heretofore described including the spring latches 66, latch loops 67, and latch springs.

The grounded surface distribution system according to the present invention is versatile and permits numerous combinations of standard elements to provide a variety of circuit control centers. There is illustrated in FIGS. 17 to 20 a two-level tap arrangement for a control center which permits some reduction in space and in the number of components required. However, these components are not fully interchangeable with the previously described standard components. As therein illustrated, for example, there is shown a switching or control center wherein a tap 178 is taken from a main line 179, 180. Each of the lines and the tap, 178, 179 and 180 includes a respective cable 181, 182, 183 terminating in the cable terminals 30 similar to that described in the embodiment in FIGS. 1, 2 and 3. Each of the cable terminals 30 is supported by a three way mounting clamp 184 from a grounding rod 185. Each of the cables 181, 182 and 183 is of the grounded surface type having the plurality of strands 48 of grounding wire which are first secured to the extension members 92 on the respective cable terminals 30, and are run through a ground clamp grounded to the grounding rod 185 in the manner previously described. The cable terminals 30 associated with the line 179, 180 is supported at the same vertical level; however, to provide the multi-level tap, the tap assembly 178 is supported at a higher elevation. To this end the housing of the cable terminal 30 may be provided with suitable locating means such as a detent or the like.

To provide suitable control functions, there may be provided a line fuse 190 of the current limiting type and interconnecting the line assemblies 179 and 180 in a conventional manner. However, additionally the line fuse 190 is provided with an upwardly extending standard conical sealing portion 191 having the standard conical sealing surface 41 and defining a tap from the line 179, 180.

To provide for connection of the tap 178, there may be provided a tap fuse 192, similar to that heretofore described, but having one of its standard sealing portions longer than the other joining between the cable terminal 30 of the tap 178 and the sealing portion 191 of the line fuse 190. Thus, there is provided a switching center wherein either line 179-180 of a loop may be isolated, or alternatively the tap 178 may be isolated. Isolation of one line 179 is illustrated in FIGS. 19 and 20. In this embodiment the line fuse 190 has been removed, and the tap fuse 192 has now been connected between the tap 178 and the line 180. In addition, the grounding cover 32 is shown on the isolated line 179. An isolating cover also may, if desired, be applied to this component.

The tap can also be connected directly to the terminal of a component by using an L-shaped coupler 200 illustrated in FIG. 21. As therein illustrated, the L-coupler 200 is connected directly to a terminal 201 of an electrical apparatus fragmentarily illustrated at 202. The terminal 201 includes the connector assembly with the switch connector 50b cast within a hard dielectric 203, and similar to the switch connector 50b of the connector 50 more fully described in the embodiment of FIGS. 1 through 3. However, briefly, the switch connector 53a includes the socket member 51a provided with a plurality of fingers 62 biased together by the tension ring 63. The follower 73 will project through the liner 72 under the force of the compression spring 74 to provide the arc-extinguishing feature of the terminal. The terminal 201, of course, is provided with the standard conical sealing surface 41 and the conical skirt 65 to provide latching thereto.

The L-coupler 200 includes a conducting housing 204 enclosing a cable connector 50a, similar to that described in the embodiment of FIGS. 1, 2 and 3. Briefly, the cable connector 50a includes the receptacle 51 having a plurality of fingers 62 biased together by the tension ring 63 and defining the pin cavity 53. The pin 52 is secured to the end of the tap cable 45 and is received within the pin cavity 53 to provide the connection between the cable 45 and the cable connector 50a. The coupling connector 77 extends from the cable connector 50a at right angles thereto. The entire connector cable and cable 45 is encased within a soft dielectric 204 held under compression to provide void-free interfacial engagement by means of the thrust spring 37 interposed between the cover 35 and the cup retainer 39. The coupling conductor 77 is receivable in the pin cavity 53 of the cable connector 50a in the terminal 201. The soft dielectric is provided with the standard conical sealing surface 91 engageable in void-free relationship with the conical sealing surface 41 by means of the standard latches and springs.

Although the L-coupler 200 could be used in a switch center or cluster of cable terminals 30, it has particular usefulness as a connection to such electrical apparatus as transformers and circuit breakers. Moreover, it is noted that only in the case of the L-coupler 200, the line cable 45 remains with the removable switching component.

It is, of course, necessary to provide for cable splicing or joining and to this end there is provided a cable splice 210 illustrated in FIGS. 22 to 24. The two ends of the cable splice 210 are identical, and accordingly, only one is illustrated and described in detail as shown in broken away cross section. The splice includes a conducting housing 211 of stainless steel or other suitable material and including at both ends the covers 35, each of which engages the two side pins 36 in a spiral bayonnet action permitting the inner thrust spring 37 to be compressed in the latched position as shown so as to exert an axial thrust on a soft dielectric filler 212 by exertion of load against the cup retainer 39. The soft dielectric filler 212 is designed to receive the ends 213, 214 of a power cable 213, 214 similar to the cable 45 heretofore described. The end thrust springs 39 permit a reasonable range in diameter variation and still maintain a very permanent void-free interfacial seal between the insulation 213 and the soft dielectric filler 212.

Encased within the soft dielectric filler 212 is a coupling 215 including two opposed cable connectors 50a, each identical to the cable connectors 50a illustrated in FIGS. 1, 2 and 3. Briefly, each cable connector 50a includes a receptacle 51 and a pin 52, which pin 52 is secured to the conductor in the cables 213 and 214, respectively. The receptacle 51 defines a pin cavity 53 formed by a plurality of fingers 62 and held with an inwardly bias by the tension ring 63. The operative components of the coupling 215 are housing within a conductive cylinder 216 which serves the same function as the conductive layer 81 in the embodiment of FIGS. 1, 2 and 3, and which further serves to isolate the movable portions of the coupling assembly 215 from the soft dielectric filler 212. It will be recognized that the operative components for the cable connector 50a are identical to those illustrated in FIGS. 4 and 5.

To provide the continuous grounded surface of the system, the cables 213 and 214 are each covered with the grounding strands 48 of wire and which are secured to the extension members 92 of the respective covers 35 by the split bolt connectors 93 thus maintaining a continuation of the grounding conditions.

FIGS. 25 and 26 illustrate an embodiment of a circuit control center or switching center arranged similar to that illustrated in FIGS. 17 through 19, but employing a modified T-tap terminal for the terminals of the loop cables. As therein illustrated, there is provided a T-tap terminal 220 for terminating ends of the loop cables 221 and 222, respectively. The T-tap terminal 220 includes a pair of cable connectors (not shown), each similar to cable connector 50a described in the embodiment of FIGS. 1 to 3, for receiving pins connected to the end of the associated cable. The assembly is encased in the soft dielectric filler and held under compression by the decribed thrust spring acting between the retainer and the cover. A central bus interconnects the cable connectors associated with the respective cables 221 and 222 within a grounded housing 223. Moreover, a central tap or riser 224 extends from the T-tap terminal 220 and includes a switch connector such as that illustrated as 50b in FIGS. 1 through 3. The riser 224 terminates in a standard conical sealing surface so as to join with the switch coupler 100 heretofore described.

A tap line 225 is provided with a standard cable terminal 30 so that the switch coupler 100 joins in the manner heretofore described between the riser 224 and the terminal 30. The terminal 30 and T-tap terminal 220 are held in the proper space and vertical relationship by a mounting clamp 226 secured to a grounding rod 227.

Although the T-tap terminal 220 is not fully interchangeable with other components of the system, its simplicity of construction and its single unit assembly make it desirable in some installations.

Figure 27:
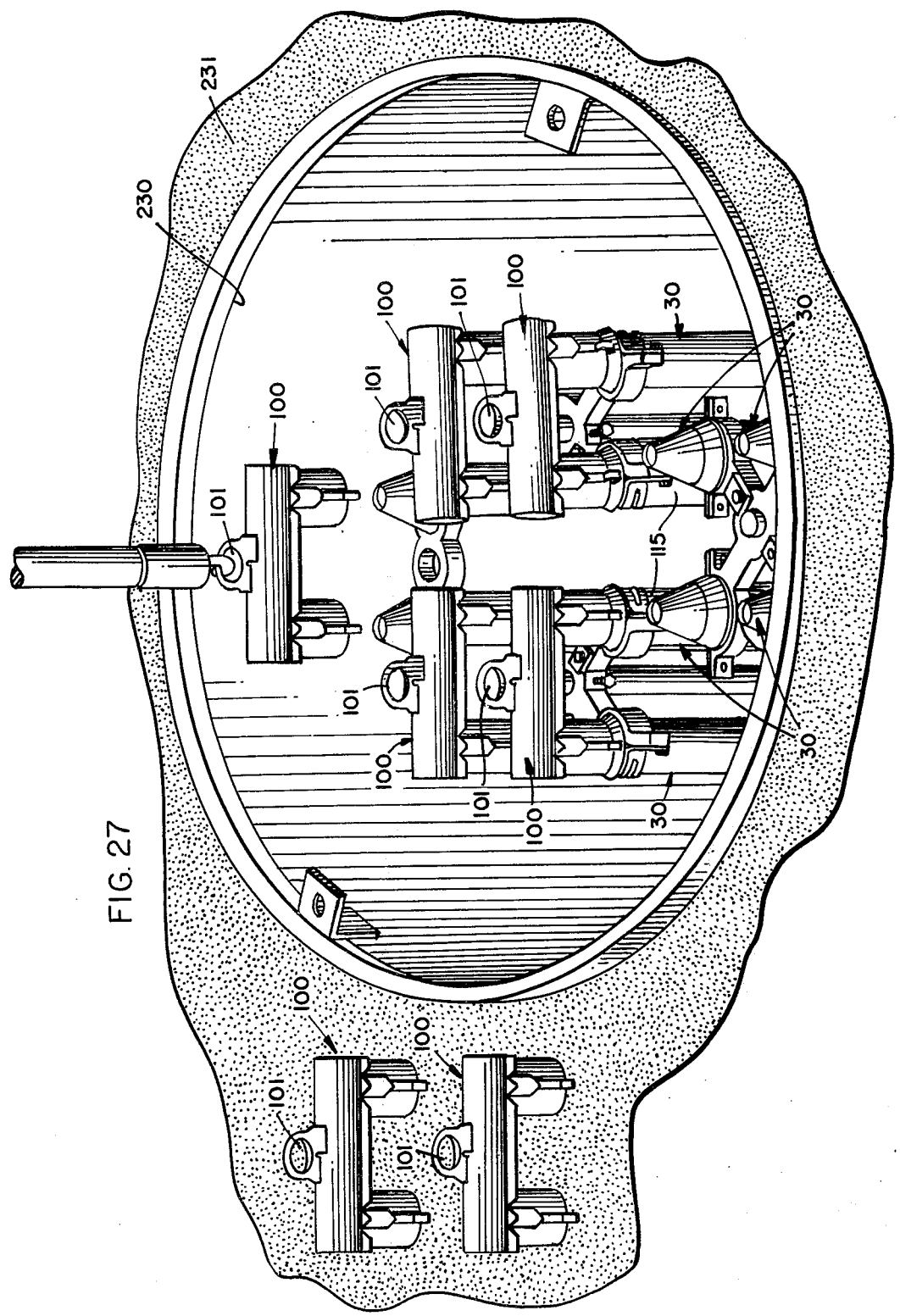
FIG. 27 illustrates a sub-surface switching point assembly.

FIG. 27 illustrates a typical switching center or control center wherein the components are positioned within a well casing 230 below the surface of the earth 231. As therein illustrated, there is provided a plurality of cable terminals 30 and a plurality of multitap manifolds 115, each of the terminals 30 and manifolds 115 terminating in the standardized conical sealing surfaces. Suitable functional components, such as the illustrated switch couplers 100, connect the manifolds and cable terminals in the desired manner to provide the loop, sectionalizing or other desired function. The switch couplers 100 may be removed from the switching center by a standard hot line tool hooked through the loop 101 of the responsive component. Switching couplers 100 removed from the switching center may be set aside, such as illustrated in FIG. 27, to provide a visual isolation of the respective lines. It is understood that a grounding cap, surge arrestor, or other suitable component may be placed over the terminals or manifold risers after the switch coupler has been removed therefrom.

From the the above description, it is seen that there is provided an improved grounded-surface distribution system wherein the entire electrical structure is enclosed in metal housings thick enough to provide mechanical support and to carry fault current if it occurs. The entire high potential conductor system has been placed inside of these grounded housings with adequate coupling and transistion means for carrying out switching and sealing functions. A void-free elastomer or soft dielectric surrounds to high voltage elements with compression springs at appropriate locations to maintain all critical interfaces void-free and under pressure at all ambient variations expected in the field. Each circuit is maintained separately in its own grounded sheath with interfitting components available to set up various functions such as switching or load-break disconnect. In this simple case the two cable terminals are clamped into a rigid two-way bracket mounted on a ground rod. The switching feature is present in both cable terminals independent of each other. The switch blade is a grounded surface inverted "U" which can be removed with a hot stick from above. The operator moves only the coupling piece. The cables or terminals are not moved or disturbed in operation. The hot circuits are never exposed since the followers fill the connector openings when the switch is opened. The open circuits are visually separated and metallic grounds are between them. Insulating or grounding caps may be securely latched over the elements of the open switch. Thus, the switch may be open with separate caps or closed with the "U" coupling and completely safe without hazard to operating personnel working in close proximity to them. An important feature of this system resides in the double load break which is always present since each cable terminal contains an arc-quenching system which separates both sides of the high voltage circuit simultaneously from the removable coupler element. This insures more effective load break function and greater safety to the operator and requires no movement of the energized cables except in the single embodiment of the L-coupler illustrated in FIG. 21.

Although the present invention has been described by reference to several embodiments thereof, it will be apparent that numerous other modifications and embodiments will be devised by those skilled in the art which will fall within the true spirit and scope of the present invention.

What is claimed as new and desired to be secured by letters Patent of the United States is:

1. A totally enclosed electrical component for readily removable installation in a run of medium-voltage cable between a source and a principal load, comprising
    a circuit element to be enclosed,
    a defined body of high dielectric strength material enclosing said circuit element from the exterior environment, first connector elements permanently and hermetically attached to said component and electrically communicating with said circuit element, and second connector elements adapted for sealed connection to the cable and formed of shape complementary to said first connector elements to mate with said first connector elements to form an hermetically sealed releasable and reconnectable joint of low leakage under high potential stress between the cable and the component, all electrical conductors passing from the exterior environment to the interior of said defined body being covered exteriorly of said defined body by fluid-impervious insulating material of thickness and dielectric strength sufficient to maintain electrical integrity of said connector elements in hostile environments under the voltage levels imposed thereon, whereby the component may be totally enclosed when installed in a hostile environment without need of enclosure for protection against that environment beyond that normally provided for the cable itself.

2. An electrical component as described in claim 1 and wherein said component is formed as an elongate mass and said first connector elements are mounted on the side of said component along its length with their axis generally transverse to the principal axis of said component, and said second connector elements are generally L-shaped.

3. An encapsulated electrical component for installation in a medium-voltage supply cable between the ends thereof, comprising a circuit element to be protected, a defined mass of electrically insulating material surrounding and enclosing said circuit element to protect it, and high dielectric strength low-leakage path connector elements electrically communicating with said circuit element and permanently hermetically sealed to said mass of electrically insulating material, and adapted to mate with complementary high dielectric strength low-leakage-path receptacle elements on the cable, said connector elements being adapted to releasably and hermetically seal to the receptacle elements to form an electrical conduction path from the cable through the connector elements to the circuit element which is hermetically isolated from the exterior environment, with the cable remaining readily disconnectable from and reconnectable to the encapsulated component, all electrical connector elements passing from the exterior environment into said mass of electrically insulating material being sealed from said exterior environment to prevent hostile fluid intrusion to the vicinity of the connector elements outside said mass of electrically insulating material whereby the circuit element and connector elements are totally insulated when installed.

4. A plug-in type encapsulated electrical component for installation at a point along the length of a medium-voltage supply cable between the ends thereof, comprising a circuit element to be protected, a defined mass of electrically insulating material surrounding and enclosing said circuit element to protect it, a first connector comprising at least a first power lead sealed to said mass of electrically insulating material with the first lead in electrical connection with the circuit element, and a second connector comprising at least a second power lead adapted to be sealed to the cable with the second lead in electrical connection with the cable, said first and second connectors being releasably and re-engageably mating with each other with the first lead in electrical connection with the second lead to electrically couple the cable to said circuit element and to form a continuous vapor-proof electrical insulation between said mass of electrically insulating material and the cable, all electrical power lead connections to said circuit element being electrically insulated to withstand hostile fluid immersion of said connections at the voltage levels imposed on said connectors, whereby the component may be installed directly in a run of of the cable in a hostile environment in total insulation without the need of further enclosure against the hostile environment.

5. An electrical component as described in claim 1 and wherein said first and second connectors mate to form a reconnectable hermetic seal, whereby intrusion of air and vapor into the vicinity of the energized conductor of the cable may be prevented, the cable having an electrically conductive shield member at ground potential and said first and second connectors and said mass of electrically insulating material being enveloped in conductive material so that the shielding effect of the shield member of the cable is carried through the first and second connectors to the component.

6. An electrical component as described in claim 1 and wherein said mass of electrically insulating material is formed of a block of solid material of high dielectric strength and low leakage sealed around said circuit element, said first connector being mounted upon said block.

7. An electrical component as described in claim 1 and wherein said first connector comprises a truncated cone of electrically insulating material, with the diameter of the cone decreasing in the direction away from the component, and an electrical conductor located generally centrally axial of said truncated cone, and said second connector comprises electrically insulating material formed in a shape generally complementary to said first connector for mating therewith and an electrical conductor located generally centrally axial of said complementary shape and adapted to make positive electrical contact with the electrical conductor central to said truncated cone, said complementary shaped insulating material being adapted to overlie and firmly contact a portion of the conical surface of said truncated cone to hermetically seal the joint between the first and second connectors and to decrease voltage leakage along that joint to the exterior environment.

8. An electrical component as described in claim 1 and wherein said circuit element is a medium-voltage fuse element of the non-expulsion type.

* * * * *

UNITED STATES PATENT OFFICE
CERTIFICATE OF CORRECTION

Patent No. 3,949,343        Dated April 6, 1976

Inventor(s) Edward H. Yonkers

It is certified that error appears in the above-identified patent and that said Letters Patent are hereby corrected as shown below:

Claim 5, column 18, line 19, change "1" to --4--;
Claim 6, column 18, line 30, change "1" to --4--;
Claim 7, column 18, line 36, change "1" to --4--; and
Claim 8, column 18, line 54, change "1" to --4--.

Signed and Sealed this

Twenty-fourth Day of August 1976

[SEAL]

Attest:

RUTH C. MASON
Attesting Officer

C. MARSHALL DANN
Commissioner of Patents and Trademarks